Figure 1:
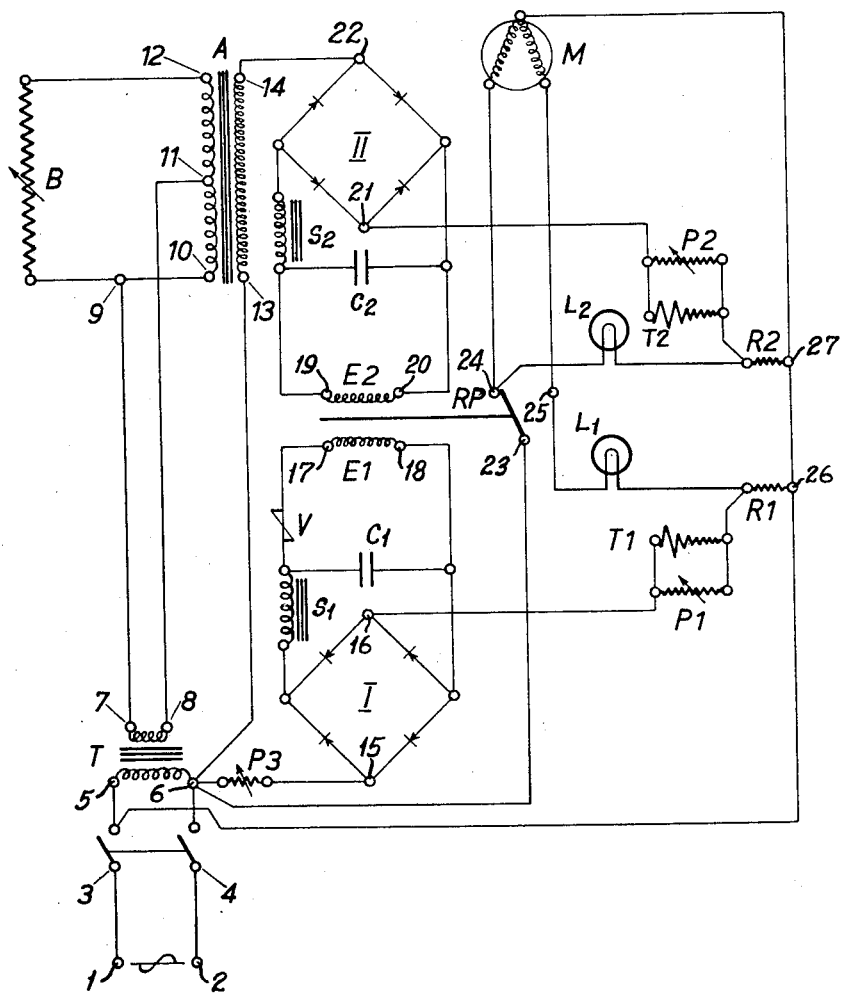

_United States Patent Office_

3,067,410
Patented Dec. 4, 1962

3,067,410
AUTOMATICALLY CONTROLLING ELECTRIC REGULATOR SYSTEM OF TEMPERATURE, PRESSURE OR MOISTURE
Joseph Louis, Bitschwiller-les-Thann, France, assignor to Societe Alsacienne de Reglage Thermique "Sart," S.a.r.l., Bitschwiller-les-Thann (Haut-Rhin), France
Filed June 5, 1958, Ser. No. 740,118
Claims priority, application France June 5, 1957
7 Claims. (Cl. 340—213)

The present invention relates to automatically controlling electric regulator systems, chiefly of temperature, pressure or moisture, which may be detected, respectively, by variations in the electric resistance of a metallic wire or of a metallic oxide patch, by variations of a potentiometer controlled by a diaphragm, by variations in resistance of a hygroscopic salt or by the heat-difference of a humid probe and a dry probe.

It is a known fact that, in the case of automatic control operations, small modifications in the current are provided which are difficult to make use of without resorting to numerous auxiliary means and, therefore, the electrical regulators used for controlling various fluids as a function of parameters, cited above, show often the serious drawbacks of being intricate, delicate and non-economical in their manufacture, with a view to obtain a prescribed accurateness.

It is one object of the present invention to provide an automatically controlling electric regulator system of temperature, pressure or moisture, which removes or at least reduces the drawbacks of the known devices to a minimum by providing a simple, mechanically resistant, sensitive and highly adaptable apparatus.

It is another object of the present invention to provide an automatically controlling electric regulator system which includes a differential transformer, transforming the fluctuations of the magnetic flux, resulting from the difference between the two primary magnetic fluxes created by two alternating currents in opposition, one of which is modulated by the arrangement detecting the variations of the phenomenon to be regulated, in variations of voltage amplified by the secondary winding of the transformer.

It is a further object of the present invention to provide an automatically controlling electric system, which includes a differential relay having two windings in opposition, the first of the windings being disposed in a detection circuit and the other of the windings being in a regulation circuit, and operating under the action of the magnetic flux resulting from the difference between the two fluxes, one of which is produced by a current rectified and filtered in the mentioned detection circuit including the secondary winding of the transformer and thus controlled by the arrangement which is sensitive to the variations of the phenomenon to be regulated, while the other flux is created by a current which is constant, but capable of being modified by a potentiometer passing in a circuit adapted to shift the point of operation of the relay controlling in one or the other way the device, thus correcting the variations of the phenomenon to be regulated.

It is still another object of the present invention to provide an automatically controlling electric regulator system which includes a varistor, compensating the voltage variations in the mains which are in series, in the regulation circuit, with the second winding of the differential relay.

It is also a further object of the present invention to provide an automatically controlling electric regulator system which includes a heat-controlled means for a stabilizing operation.

It is yet another object of the present invention to provide an automatically controlling electric regulator system which includes means for accelerating the switching of the sensitive relay with a view to produce a clean contact.

The thermal control is advantageously obtained by means of thermistors positioned above signalling lamps and inserted in series with the relay. The moment at which it is obtained the switching is adjusted by means of potentiometers.

Figure 2:
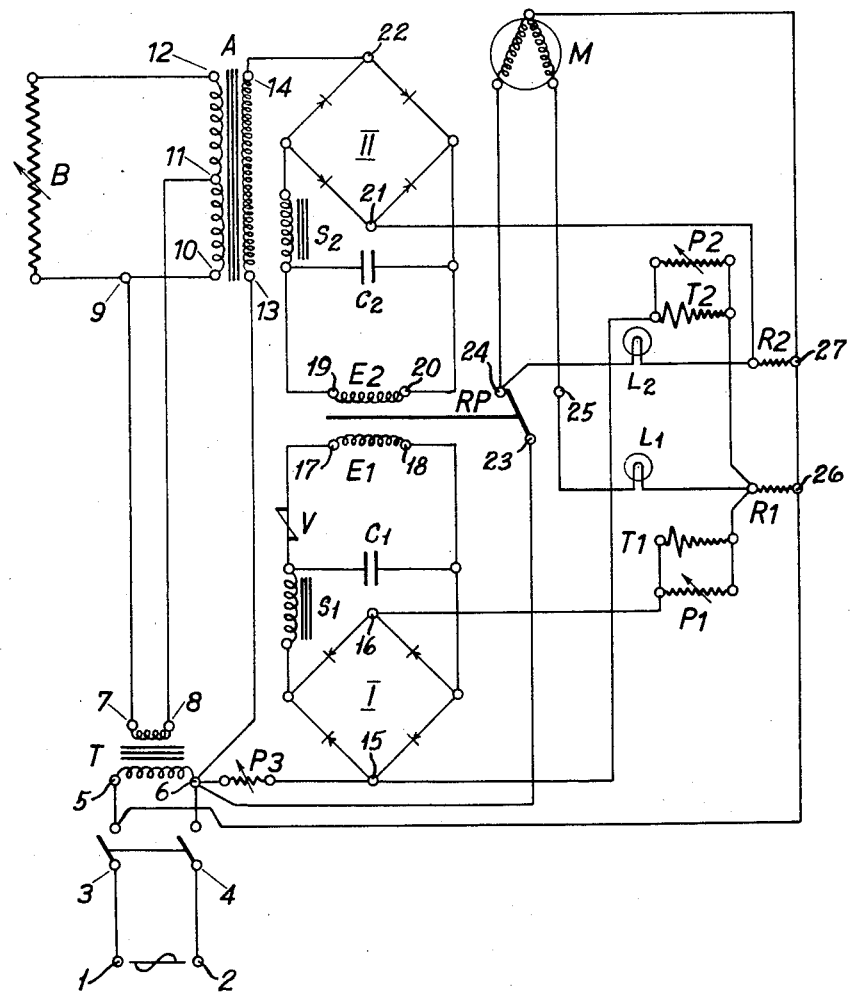

With these and other objects in view, which will become apparent in the following detailed description, the present invention will be clearly understood in connection with the accompanying drawings, in which:

FIGURE 1 is a wiring diagram for an electric regulator system for controlling the temperature, according to the present invention; and FIG. 2 is a similar wiring diagram having a slight modification.

Referring now to the drawings, and in particular to FIG. 1, the electric regulator for controlling the temperature has, as a sensitive element to variations of the temperature to be controlled, a variable resistance B, a metallic wire for instance, and the latter brings about the regulation essentially by means of applying an electric voltage upon one of two stationary contacts 24 or 25 of the switch 23, 24, 25 controlled by a polarized relay RP, to control a receiver M consisting of a small motor or a switch controlling the device ensuring the corrections of the heating.

The regulator, according to the present invention, is fed by the mains 1, 2 through the switch 3, 4 and the voltage transformer T lowering it to allow the using of standard sensitive elements and to give a security voltage, the secondary winding of which supplying at its terminals 7, 8 an alternating current running in the circuit 7, 9, B, 12, 11, 8, the intensity of which is modulated by the variations of the resistance B, which feeds the first section 12, 11 of the primary winding of a differential transformer A, while the second section 11, 10 of the primary winding is fed in opposition by another alternating current running in the circuit 8, 11, 10, 9, 7. The transformer A operates when provided with a core in the area providing a maximum magnetic susceptibility, and the second alternating current produces a predominating field so as to remain as required within the area of optimum magnetization and to supply the major part of the energy required. The secondary winding, between the terminals 13, 14, of the transformer A transforms the fluctuations of the magnetic flux resulting from the difference between the two primary fields created by the two alternating currents in variations of voltage and amplifies them in order to supply a voltage as high as possible, because it includes a very large number of convolutions. This voltage induced in the winding 13, 14 is in its turn set in opposition to a higher alternative potential producer at the terminals 5, 6 in the feeding mains in order to differentially produce a current in the circuit 6, 13, 14, cell II, 27, 5, the voltage of this current being suitable to the means, controlled through the receiver, controlled itself by the relay RP, adapted to ensure the correction of the temperature variations, as, for instance, relays, gas-filled or vacuum tubes, transistors and the like.

The amplification of the obtained voltage between the terminals 13, 14 is limited by the losses resulting from the electric resistances of the coils and the hysteresis of the magnetic circuit; the volume of the latter can be very much reduced by using special sheets of alloys having a high susceptibility as those marketed under the name of Numetal, Permalloy and others, which diminish strongly the losses in the copper and in the magnetic circuit. The ratio of transformation and consequently the sensibility of the apparatus can thus be increased.

The polarized relay RP has two windings E1 and E2 in opposition to operate the switch 23, 24, 25. The current feeding the winding E2 results from the difference between the feeding voltage between the terminals 5, 6 of the primary winding of the feeding transformer T and the voltage less high induced at the terminals 13, 14 of the secondary winding of the transformer A. It is rectified in the cell II including rectifiers in the bridge 21, 22 and filtered by a coil S2 and by a capacity C2 before entering the winding E2 between its terminals 19, 20. The circuit 6, 13, 14, cell II, 27, 5 is a detection circuit sensitive to the fluctuations in the temperature resistance B.

A second circuit 6, P3, 15, 16, 26, 5 is a regulator circuit. The alternative current is constant; it is rectified in the cell I by rectifiers mounted in the bridge 15, 16 and filtered by a coil S1 and the capacity C1 and feeds the second winding E1 of the relay RP, a varistor V being mounted between the coil S1 and the winding E1, between the terminals 17 and 18 to cut out automatically the influence of the variations resulting from the composition of the circuits feeding the rectifiers I and II. The varistor V, consisting of a half-conductor, the resistance of which varies considerably with the voltage, is necessary because the voltage appearing in the mains 1, 2 is warranted only at + or −10%.

A magnetic flux is thus created by the winding E1 in opposition to the flux created by the winding E2, which serves the purpose of shifting the point of operation of the relay RP, a potentiometer P3 mounted in series between the terminals 6 and 15 allowing the modification of the constant value of the regulating circuit according to the technical conditions. The adjustment of the temperature to be controlled may thus be ensured.

When the current passing through the winding E2 increases to a value higher than the constant current passing through the winding E1, the relay RP operates the switch and a current is fed through the circuit 6, 23, 24, M, 5, for instance, or 6, 23, 25, M, 5, which causes start of the rotation of the little motor M in the direction of increase or decrease of the magnitude to be regulated, to wit the temperature, according the sense of the variation having provoked the current variation in the resistance B, and consequently in the winding E2. On the contrary, the current in E2 decreasing to a value less than the current in E1, the relay operates the switch to feed a current through the circuit 6, 23, 24, M, 5 or 6, 23, 24, M, 5. According to the prescribed value of the temperature to be maintained, the value of the constant current in E1 is regulated by the potentiometer P3. When the temperature is maintained, there is no variation in the resistance B and there is a balance between the currents in E2 and E1, and the movable contact 23 is between 24 and 25.

However, as, in case heating fluid, for instance, is to be regulated, the transmission of the fluctuation of temperature to the resistance B is made slowly, under normal conditions, because the thermal balance between the heating fluid and the mass of members, subjected to temperature variations, requires a certain moment, it happens that an inertia producing a delay provoking inevitably an excess upon the temperature value to be maintained. Therefore, in order to avoid such an excess and to stabilize the operation of the regulator, a thermal control is obtained by means of the thermistors T1 and T2, consisting of semi-conductors, the resistance of which varies considerably with the temperature, which semi-conductors are positioned over the two signalling lamps L1 and L2 mounted, respectively, between the resistances R1 and R2 and the stationary contacts 25 and 24 of the switch of the relay RP to point out the working of the receiver M, according to the position of the movable contact 23. When the contact 23 is between the contacts 24 and 25, the lamps L1 and L2 are not lit; when the contact 23 connects 24, the circuit 6, 23, 24, M, 27, 26, 5 is closed and the lamp L2 is lit, the circuit 6, 23, 24, L2, R2, 27, 5 being closed, the thermistor is heated, and the receiver M turns. When the contact 23 connects 25, the circuit 6, 23, 25, L1, 26, 5 is closed, the lamp L1 is lit and heats the thermistor T1. The resulting drop in resistance in the thermistors T1 and T2 is proportioned to the duration of the ignition of the lamps L1 and L2.

The thermistors T1 and T2 are mounted in series, respectively, between the terminals 16 of the cell I and 21 of the cell II and the terminals 26 and 27. As the drop in resistance produces an increase of current in the circuit I or II and finally in the winding E1 or E2, this increase advances the moment of the breaking of the current feeding the receiver M ensuring the correction of the variation of the phenomenon, in comparison to the moment at which the breaking would have happened without the using of the thermistor.

The lead in breaking of the current feeding the receiver M is adjustable by means of the potentiometers P1 and P2, which shunt a fraction of current passing through the thermistors T1 or T2 for the purpose to adjust the increase of current produced by the heat of the signalling lamps L1 or L2 associated therewith.

However, the second thermistor T2, instead of being in series with the cell II, which reduces the sensitivity of the relay by an increase of the resistance of the cell II, is inserted shuntwise across the cell I, as shown in FIG. 2, which reduces the intensity of the current in the winding E1 of the relay RP at the desired moment. According to this new arrangement, the potentiometer P1 and the thermistor T1 constitute a sub-unit in series with the circuit I, while the elements T2 and P2, which do not participate in the detection of the variations of the phenomenon to be regulated, are thus a little passive in the sensibility point of view and diminish, therefore, somewhat the accurateness of the regulator, and are connected shuntwise across the cell I, the thermistor T2 provoking thus a drop in the voltage, the effect of which upon the circuit I is the reverse of the effect which would take place upon the circuit II.

In order to prevent the relay RP from operating too slowly, which would be detrimental to the proper state of the contact-pieces when quite near each other, resistances R1 and R2 are inserted in the circuits 16, T1, 26, 5 and 21, T2, 27, 5 and the signalling lamps L1 and L2 are connected with one phase of the feed supply through these resistance R1 and R2, respectively. The ignition of the lamps L1 and L2, respectively, at the tilting of the movable contact 23 upon the stationary contacts 25 and 24 in the switch of the relay RP, leads thus to a slight drop in voltage in the corresponding circuits controlled by the relay, to wit: 6, 23, 25, L1, 26, 5 and 6, 23, 24, L2, 27, 5, and consequently to a clean switching since there is an instantaneous modification of the magnetic flux in the relay.

It is also possible to obtain a more energetic attraction for the relay contact upon closing, while its opening requires less energy, without detriment to the precision of the device. The resistances R1 and R2 are cold at the moment of closing the circuit and cause a maximum voltage drop, chiefly if they are replaced by thermistors, which provoke, consequently a more energetic attraction, while, after, several seconds of operation, heated by the signalling lamps, their resistance decreases, and their opening will take place under a less high impulse without biasing this stability of the apparatus.

While I have disclosed two embodiments of the present invention, it is to be understood that these embodiments are given by example only and not in a limiting sense, the scope of the present invention being determined by the objects and the claims.

I claim:

1. An electric regulator for the automatic control of any phenomenon, more particularly temperature, pressure or moisture, comprising
in combination
a device sensitive to the phenomenon changes to be regulated and of which electric variations are produced by said changes,
a differential transformer including a primary winding divided into a first section and a second section, both said sections disposed in series with each other,
a secondary winding having a large number of convolutions,
a voltage transformer,
an alternating feeding system supplying, at its voltage lowered through said voltage transformer, a first alternating current,
the intensity of said first alternating current being modulated by the variations of said device sensitive to the phenomenon changes,
said alternating feeding system feeding said first section of said primary winding of said differential transformer,
a second alternating current of the same frequency but in phase opposition to said first alternating current,
the latter being not modulated but passing in a constant measurement resistance and feeding said second section of said primary circuit,
a main circuit, divided into two sections, supplied at its proper voltage by said alternating feeding system,
one of said two sections of said main circuit including said secondary winding of said differential transformer being fed by the latter in opposition to said higher supplying voltage, with amplified voltage variations in correspondence with the fluctuations of a magnetic flux resulting from the difference between the two primary fluxes in said primary winding produced by said two alternating currents,
the other section of said main circuit including a potentiometer to modify its current, the value of which being maintained constant,
a varistor providing a compensation for the modifications in the voltage of said alternating feeding system,
a differential relay including two windings,
each of said windings being disposed in one of said two sections of said main circuit and operating under the action of the flux resulting from the difference between the flux produced by the current passing in said first winding mounted in said first section of said main circuit under the action of the variations of said device being sensitive to the phenomenon changes and the flux created by the current having a constant value passing in said second relay winding mounted in said second section of said main current, which determines the operation point of said differential relay,
an operating circuit supplied by mains of said alternating feeding system including a switch controlled by said differential relay,
a receiver fed in opposite direction by said operating circuit under the control of said switch and intended to correct the phenomenon changes,
heat means stabilizing the regulation, and
means accelerating the relay operation.

2. The electric regulator, as set forth in claim 1, which includes
heat-operated means stabilizing the compensation for the modifications in voltage of said mains feeding current in said second section of said main circuit.

3. The electric regulator, as set forth in claim 1, which includes
thermistors disposed in series with the corresponding of said windings of said differential relay,
signalling lamps disposed selectively in parallel in said operating circuit under the control of said switch,
said signalling lamps heating said thermistors to produce a drop in resistance proportioned to the duration of the ignition of said signalling lamps and causing, thereby, an increase in the current flowing through said operating circuit.

4. The electric regulator, as set forth in claim 3, which includes
additional potentiometers disposed shuntwise across the corresponding of said thermistors to adjust the operation of the latter.

5. The electric regulator, as set forth in claim 1, which includes
thermistors disposed, respectively, in series with one of said windings, of said relay and shuntwise in relation with other of said windings, signalling lamps disposed selectively in parallel in said operating circuit under the control of said switch,
said signalling lamps heating said thermistors to cause a drop in resistance proportioned to their duration of ignition and, thereby, an increase in current flowing through said operating circuit.

6. The electric regulator, as set forth in claim 1, which includes
a branch circuit for each of said sections of said main circuit,
said switch closing selectively said branch circuits under the control of said relay, and
means disposed in series with one of said windings of said relay for shifting the point of operation of said relay.

7. The electric relay, as set forth in claim 6, which includes
a further resistance subjected to the heat of said signalling lamps,
said further resistance being disposed in each of said two sections of said main circuit and feeding in parallel said signalling lamps and said thermistors associated therewith.

References Cited in the file of this patent

UNITED STATES PATENTS

| | | |
|---|---|---|
| 1,225,388 | Woodbridge | May 8, 1917 |
| 1,718,494 | Schurig | June 25, 1929 |
| 1,720,352 | Schmierer | July 9, 1929 |
| 2,181,579 | Curtis | Nov. 28, 1939 |
| 2,721,297 | Estelle | Oct. 18, 1955 |
| 2,806,153 | Walker | Sept. 10, 1957 |

FOREIGN PATENTS

| | | |
|---|---|---|
| 625,128 | Great Britain | June 22, 1949 |